Jan. 13, 1959 F. H. WRIGHT 2,869,069
VOLTAGE STABILIZER AND REFERENCE CIRCUIT THEREFOR
Filed Nov. 20, 1953
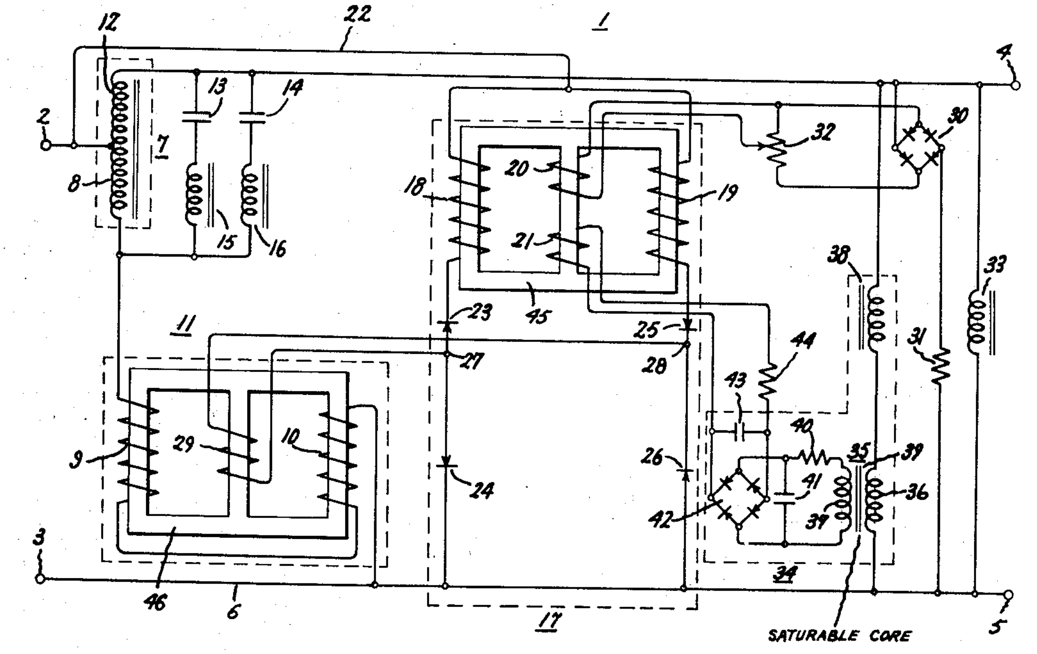
Inventor:
Floyd H. Wright,
by Robert G. [signature]
His Attorney.

United States Patent Office
2,869,069
Patented Jan. 13, 1959

2,869,069

VOLTAGE STABILIZER AND REFERENCE CIRCUIT THEREFOR

Floyd H. Wright, Fort Wayne, Ind., assignor to General Electric Company, a corporation of New York Application November 20, 1953, Serial No. 393,436

11 Claims. (Cl. 323—66)

This invention relates to alternating current voltage stabilizers of the static magnetically controlled type and to reference circuits usable either independently or as a component of such voltage stabilizers.

In many engineering measurement and control problems, it is desirable to provide a source of alternating current voltage which remains relatively constant regardless of variations in the line voltage or frequency. Such a device is commonly referred to as a voltage stabilizer and it is desirable that it contain no moving parts or vacuum tubes, that its output voltage not be effected by limited variations in the frequency of the input voltage, and that it not contain any excessively expensive components.

A well known type of voltage stabilizer is referred to as a changing impedance stabilizer. In this type of device, a variable internal impedance is arranged between the input and the output with a control system automatically changing the variable impedance to the correct value. This control system is commonly termed a servomechanism or feedback system since the output of the stabilizer is compared with a reference or standard voltage and the difference or error is amplified and used to control the variable internal impedance thus maintaining a constant output voltage. Voltage stabilizers of this type have in the past used vacuum tube amplifiers and it is therefore desirable to provide a voltage stabilizer incorporating a static magnetic amplifier in order to eliminate the vacuum tubes. Furthermore, in order to provide a voltage stabilizer which is not effected by limited frequency variations of the power source, it is necessary that the source of reference voltage provide a voltage which not only does not vary directly with the output voltage but also which does not vary with the frequency. Given such a reference circuit, it is apparent that it may be utilized not only to control a feedback voltage stabilizer system, but also as a voltage stabilizer in its own right with sufficient amplification to provide the desired power output.

It is therefore an object of this invention to provide an improved voltage stabilizer of the feedback type, incorporating the desirable features set forth above.

Another object of this invention is to provide an improved reference circuit incorporating the desirable features set forth above.

Further objects and advantages of this invention will become apparent by reference to the following description and the accompanying drawing; and the features of novelty which characterize this invention will be pointed out with particularity in the claims annexed to and forming a part of this specification.

In accordance with this invention, a voltage stabilizer is provided having variable impedance means interposed between the input and output. The variable impedance means may include an autotransformer with its primary and a saturable core reactor connected across the input and its secondary connected to the output. The output of the stabilizer is compared with a reference voltage by applying these two quantities to the control windings of a magnetic amplifier. The output of the magnetic amplifier is connected to the control winding of the saturable core reactor and thus the difference between the reference voltage and the output voltage of the stabilizer is amplified and used to vary the impedance of the saturable reactor to a value sufficient to bring the difference to zero thus maintaining a constant output voltage.

The improved reference circuit of this invention includes a transformer having a core which tends to saturate at a voltage less than the peak value of the voltage applied to the primary. A current limiting device such as a reactor may be inserted in series with the primary, or the transformer primary may be constructed to limit the current. A resistance and capacitor are serially connected across the secondary of the saturable core transformer thus forming an integrating circuit in which the voltage which appears across the capacitor is proportional to the peak flux in the transformer core. Since the peak flux in the transformer core is limited by the saturating action, the voltage across the capacitor will be substantially constant. This output voltage may be rectified and filtered for providing a direct current output for feeding one control winding with a magnetic amplifier of the above described voltage stabilizer or the output may be merely filtered to provide a constant alternating current voltage output.

The single figure of the drawing schematically illustrates the improved voltage stabilizer and reference circuit of this invention.

Referring now to the drawing, there is shown a voltage stabilizer generally identified as 1 having input terminals 2 and 3 and output terminals 4 and 5, the input terminal 3 and the output terminal 5 being connected by a common bus 6. An autotransformer 7 is provided having one side of its primary 8 connected to input terminal 2 and the other side thereof connected in series with power windings 9 and 10 of saturable core reactor 11. The other side of the serially connected power windings 9 and 10 is connected to common bus 6. The secondary 12 of autotransformer 7 is connected to output terminal 4. Series filter circuits are connected across autotransformer 7 including capacitors 13 and 14 and reactors 15 and 16.

A magnetic amplifier 17 is provided having parallel connected power windings 18 and 19 and direct current control windings 20 and 21. Input terminal 2 is connected to one side of the power windings 18 and 19 by line 22 and the other sides thereof are respectively connected to bus 6 through back-to-back rectifiers 23 and 24 in series with power winding 18, and 25 and 26 in series with power winding 19. The output of magnetic amplifier 17 taken from terminals 27 and 28 intermediate rectifiers 23 and 24, and 25 and 26 respectively is connected to direct current saturating winding 29 of saturable core reactor 11. Direct current saturating winding 20 of magnetic amplifier 17 is directly connected across output terminals 4 and 5 by means of bridge rectifier 30 having its input connected across terminals 4 and 5 with a serially connected current limiting resistor 31 for energization responsive solely to the output voltage across output terminals 4 and 5. Potentiometer 32 controls the voltage actually applied to direct current saturating winding 20 and is used for calibration purposes or output voltage setting. A filtering reactor 33 is also connected across output terminals 4 and 5. Direct current saturating winding 21 is connected to reference circuit 34 to be now more fully described.

Reference circuit 34 includes a transformer 35 having a primary winding 36 and a secondary winding 37. Primary winding 36 is connected in series with current limiting reactance 38 across output terminals 4 and 5. The core 39 of transformer 35 is arranged to saturate at a voltage less than the peak voltage applied to primary winding 36 and the resulting flux in the core tends to be limited to a maximum value regardless of variations in the applied voltage. The voltage appearing across the secondary winding 37 is thus proportional to the rate of change of core flux and is thus a peaked waveform. A resistor 40 and capacitor 41 are connected in series across the secondary winding 37 thus forming an integrating circuit with the resistance of the resistor 40 being substantially greater than the impedance of the capacitor 41. The voltage which appears across the capacitor 41 will therefore be proportional to the peak flux in the core 39 of transformer 35. Since the peak value of the flux is limited by the saturating action to a substantially constant value regardless of fluctuation in the peak value of the applied voltage or frequency, the peak value of the voltage appearing across capacitor 41 will therefore be substantially constant. A bridge rectifier 42 has its input connected across capacitor 41 and its output connected to direct current saturating winding 21 of magnetic amplifier 17. Filter capacitor 43 and resistor 44 are respectively connected across and in series with the output of rectifier 42.

It will be readily apparent that a resistor may be substituted for the current limiting reactor 38 and while the resistance thereof would not be dependent on frequency, it will be less efficient than the inductive current limiter shown. The impedance of the current limiting reactor 38 and of the primary winding 36 transformer 35 are dependent upon the applied frequency, however, it will be seen that the magnitude of the overall effect on the output across capacitor 41 is limited. It will also be readily apparent that the transformer 39 may be made with sufficient internal impedance to eliminate the need for current limiting reactor 38.

In operation, the core 45 of magnetic amplifier 17 is saturated to a predetermined degree alternately by power windings 18 and 19 with the current which flows through these windings also flowing through saturating winding 29 of saturable core reactor 11 by virtue of its connection between the rectifiers 23 and 24, and 25 and 26. Saturating winding 20 of magnetic amplifier 17 which is energized from output terminals 4 and 5 and saturating winding 21 which is energized from reference circuit 34 are connected in opposition so as to provide bucking voltages, so that if the voltages respectively applied to the two windings are equal thus indicating that the output voltage across terminals 4 and 5 is at the desired level, no change in the degree of saturation produced by power windings 18 and 19 will be made. However, assuming that the output voltage is higher than the predetermined level, the effect of saturating winding 20 will overcome the effect of saturating winding 21 producing a net flux proportional to the difference between the voltages impressed on these two windings. In this case, this net flux opposes the flux produced by the power windings 18 and 19 thereby raising the impedance of the windings 18 and 19 and lowering the direct current voltage applied to saturating winding 29 of saturable core reactor 11. Here, current flowing through primary winding 8 of autotransformer 7 and through power windings 9 and 10, tends to saturate core 46 of saturable core reactor 11 to predetermined degree. Lowering the voltage applied to saturating winding 29 raises the impedance of power windings 9 and 10 and thus lowering the current flowing through the primary winding 8 thus in effect increasing the internal impedance of the autotransformer 7 and reducing the output voltage appearing across output terminals 4 and 5. Assuming now that the output voltage is lower than that called for by the reference circuit 34, the voltage of saturating winding 21 will be higher than the voltage of saturating winding 20 thus producing a net flux proportional to the difference in the two voltages in a direction to aid the flux produced by windings 18 and 19 of magnetic amplifier 17. This lowers the impedance of windings 18 and 19 thus raising the voltage applied to saturating winding 29 of saturable core reactor 11. Raising the voltage applied to saturating winding 29 lowers the impedance of windings 9 and 10 thus lowering the internal impedance of autotransformer 7 and raising the voltage applied to output terminals 4 and 5. It is thus seen that any tendency for the output voltage to vary from that called for by the reference circuit 34 produces an immediate effect tending to restore the output voltage to the desired level.

It will be readily apparent that the reference circuit 34 may be utilized independently providing a constant voltage direct current output, as is the case in the drawing, or providing an alternating current output by merely filtering the voltage appearing across the capacitor 41. This reference circuit provides an output voltage which does not vary directly with variations in the applied voltage or frequency and furthermore utilizes no vacuum tubes, moving parts or expensive components. It also will be readily apparent that the feedback voltage stabilizer of this invention incorporating the improved reference circuit possesses the same advantages, i. e. a stabilized output voltage which does not vary directly with the applied voltage or frequency, has no moving parts or vacuum tubes and utilizes only relatively inexpensive components.

While I have shown and described a particular embodiment of this invention, further modifications and improvements will occur to those skilled in the art. I desire it to be understood therefore that this invention is not limited to the form shown and I intend in the appended claims to cover all modifications which do not depart from the spirit and scope of this invention.

I claim:

1. A voltage stabilizer circuit comprising an input circuit adapted to be connected to a source of alternating current the voltage of which is to be stabilized, an output circuit for supplying a stabilized alternating current voltage, variable impedance means interconnecting said input and output circuits, said variable impedance means having a control element for varying the impedance thereof, a magnetic amplifier having its output connected to energize said variable impedance means control element, said magnetic amplifier having two control windings, one of said control windings being directly connected to said output circuit and energized solely by said stabilized voltage, and a reference source of substantially constant voltage, the other of said control windings being connected for energization from said reference source, said control windings being wound to provide bucking voltages whereby a signal proportional to the difference between the voltage of said output circuit and the voltage output of said reference source is applied to said variable impedance control element thereby to vary the impedance thereof whereby said output circuit voltage is stabilized.

2. A voltage stabilizer circuit comprising an input circuit adapted to be connected to a source of alternating current the voltage of which is to be stabilized, an output circuit for supplying a stabilized alternating current voltage, variable impedance means including a saturable core reactor interconnecting said input and output circuits, said saturable core reactor having a direct current saturating winding for varying the impedance thereof, a magnetic amplifier connected for energization from said input circuit and having its output circuit connected to energize said saturable core reactor saturating winding, said magnetic amplifier having two control windings, one of said control windings being directly connected to said output circuit and energized solely by said stabilized voltage, and a reference source of substantially constant voltage, the other of said control windings being connected for energization from said reference source, said control windings being arranged to provide bucking voltages whereby a signal proportional to the difference between the voltage of said output circuit and the voltage output of said reference source is applied to said saturable core reactor saturating winding thereby to vary the impedance of said saturable core reactor whereby said output circuit voltage is stabilized.

3. A voltage stabilizer circuit comprising an input circuit adapted to be connected to a source of alternating current the voltage of which is to be stabilized, an output circuit for supplying a stabilized alternating current voltage, an autotransformer having its primary winding connected in series with a saturable core reactor across said input circuit and having its secondary winding connected to said output circuit, said saturable core reactor having a direct current saturating winding for varying the impedance thereof, a magnetic amplifier having its output connected to energize said saturable core reactor saturating winding, said magnetic amplifier having two control windings arranged to provide bucking voltages, one of said control windings being directly connected to said output circuit and energized solely by said stabilized voltage, and a reference source of substantially constant voltage, the other of said control windings being connected for energization from said reference source whereby a signal proportional to the difference between the voltage of said output circuit and the voltage of said reference source is applied to said saturable core reactor saturating winding thereby to vary the impedance of said saturable core reactor whereby said output circuit voltage is stabilized.

4. A voltage stabilizer circuit comprising an input circuit adapted to be connected to a source of alternating current the voltage of which is to be stabilized, an output circuit for supplying a stabilized alternating current voltage, an autotransformer having its primary connected in series with a saturable core reactor across said input circuit and having its secondary winding connected to said output circuit, said saturable core reactor having a direct current saturating winding for varying the impedance thereof, a magnetic amplifier having its output connected to energize said saturable core reactor saturating winding, said magnetic amplifier having two direct current saturating windings arranged to provide bucking voltages, one of said magnetic amplifier saturating windings being directly connected to said output circuit and energized solely by said stabilized voltage, and a reference source of substantially constant direct current voltage, the other of said magnetic amplifier saturating windings being connected for energization from said reference source between the voltage across said output circuit and the voltage output of said reference source is applied to said saturable core reactor saturating winding thereby to vary the impedance of said saturable core reactor whereby said output circuit voltage is stabilized.

5. A voltage stabilizer circuit comprising an input circuit adapted to be connected to a source of alternating current the voltage of which is to be stabilized, an output circuit for supplying a stabilized alternating current voltage, an autotransformer having its primary winding connected in series with a saturable core reactor across said input circuit and having its secondary winding connected to said output circuit, said saturable core reactor having a direct current saturating winding for varying the impedance thereof, a magnetic amplifier connected for energization from said input circuit and having its output connected to energize said saturable core reactor saturating winding, said magnetic amplifier having two direct current saturating windings arranged to provide bucking voltages, one of said magnetic amplifier saturating windings being directly connected to said output circuit through a rectifier and energized solely by said stabilized voltage, and a reference source of substantially constant direct current voltage energized from said output circuit, the other of said magnetic amplifier saturating windings being connected for energization from said reference source whereby a signal proportional to the difference between the voltage across said output circuit and the voltage output of said reference source is applied to said saturable core reactor saturating winding thereby to vary the impedance of said saturable core reactor whereby said output circuit voltage is stabilized.

6. A voltage stabilizer circuit comprising an input circuit adapted to be connected to a source of alternating current the voltage of which is to be stabilized, an output circuit for supplying a stabilized alternating current voltage, variable impedance means innerconnecting said input and output circuits, said variable impedance means having a control element for varying the impedance thereof, a magnetic amplifier having its output connected to energize said variable impedance means control element, said magnetic amplifier having two control windings arranged to provide bucking voltages, one of said control windings being directly connected to said output circuit and energized solely by said stabilized voltage, and a reference circuit comprising a transformer having its primary winding connected for energization from said output circuit, said transformer having a core adapted to saturate at a voltage less than the peak value of the voltage across said output circuit, and a resistor and capacitor connected in series across the secondary winding of said transformer forming an integrating circuit, an output circuit for said reference circuit connected across said capacitor whereby a voltage is obtained substantially proportional to the peak flux in said transformer core, the other of said magnetic amplifier control windings being connected to said reference circuit output circuit whereby a signal proportional to the difference between the voltage across said output circuit and voltage output of said reference circuit is applied to said variable impedance control element thereby to vary the impedance thereof whereby said output circuit voltage is stabilized.

7. A voltage stabilizer circuit comprising an input circuit adapted to be connected to a source of alternating current the voltage of which is to be stabilized, an output circuit for supplying a stabilized alternating current voltage, variable impedance means innerconnecting said input and output circuits, said variable impedance means having a control element for varying the impedance thereof, a magnetic amplifier having its output connected to energize said variable impedance means control element, said magnetic amplifier having two control windings arranged to provide bucking voltages, one of said control windings being directly connected to said output circuit and energized solely by said stabilized voltage, and a reference circuit comprising a transformer having its primary winding and a current limiting impedance connected in series across said output circuit, said transformer having a core adapted to saturate at a voltage less than the peak value of the voltage across said output circuit, and a resistor and capacitor connected in series across the secondary winding of said transformer forming an integrating circuit, an output circuit for said reference circuit connected across said capacitor whereby a voltage is obtained substantially proportional to the peak flux in said transformer core, the other of said magnetic amplifier control windings being connected to said reference circuit output circuit whereby a signal proportional to the difference between the voltage across said output circuit and the voltage output of said reference circuit is applied to said variable impedance control element thereby to vary the impedance thereof whereby said output circuit is stabilized.

8. A voltage stabilizer circuit comprising an input circuit adapted to be connected to a source of alternating current the voltage of which is to be stabilized, an output circuit for supplying a stabilized alternating current voltage, variable impedance means innerconnecting said input and output circuits, said variable impedance means having a control element for varying the impedance thereof, a magnetic amplifier having its output connected to energize said variable impedance means control element, said magnetic amplifier having two control windings arranged to provide bucking voltages, one of said control windings being directly connected to said output circuit and energized solely by said stabilized voltage, and a reference circuit comprising a transformer having its primary winding and a current limiting inductance connected in series across said output circuit, said transformer having a core adapted to saturate at a voltage less than the peak value of the voltage across said output circuit, and a resistor and capacitor connected in series across the secondary winding of said transformer forming an integrating circuit, an output circuit for said reference circuit connected across said capacitor whereby a voltage is obtained substantially proportional to the peak flux in said transformer core, the other of said control windings being connected to said reference circuit output circuit whereby a signal proportional to the difference between the voltage across said output circuit and the voltage output of said reference circuit is applied to said variable impedance control element thereby to vary the impedance thereof whereby said output circuit voltage is stabilized.

9. A voltage stabilizer circuit comprising an input circuit adapted to be connected to a source of alternating current the voltage of which is to be stabilized, an output circuit for supplying a stabilized alternating current voltage, variable impedance means innerconnecting said input and output circuits, said variable impedance means having a control element for varying the impedance thereof, a magnetic amplifier having its output connected to energize said variable impedance means control element, said magnetic amplifier having two direct current saturating windings arranged to provide bucking voltages, one of said magnetic amplifier saturating windings being directly connected to said output circuit through a rectifier and energized solely by said stabilized voltage, and a reference circuit comprising a transformer having its primary winding connected for energization from said output circuit, said transformer having a core adapted to saturate at a voltage less than the peak value of the voltage across said output circuit, and a resistor and capacitor connected in series across the secondary winding of said transformer forming an integrating circuit, an output circuit for said reference circuit connected across said capacitor, and a rectifier in said reference circuit output circuit whereby a direct current voltage is obtained substantially proportional to the peak flux in said transformer core, the other of said magnetic amplifier saturating windings being connected to the output of said reference circuit rectifier whereby a signal proportional to the difference between the voltage across said output circuit and the voltage output of said reference circuit is applied to said variable impedance control element thereby to vary the impedance thereof whereby said output circuit voltage is stabilized.

10. A voltage stabilizer circuit comprising an input circuit adapted to be connected to a source of alternating current the voltage of which is to be stabilized, an output circuit for supplying a stabilized alternating current voltage, variable impedance means innerconnecting said input and output circuits, said variable impedance means having a control element for varying the impedance thereof, a magnetic amplifier having its output connected to energize said variable impedance control means, said magnetic amplifier having two direct current saturating windings arranged to provide bucking voltages, one of said magnetic amplifier saturating windings being directly connected to said output circuit through a rectifier and energized solely by said stabilized voltage, and a reference circuit comprising a transformer having its primary winding connected for energization from said output circuit, said transformer having a core adapted to saturate at a voltage less than the peak value of the voltage across said output circuit, a resistor and capacitor connected in series across the secondary winding of said transformer forming an integrating circuit, said resistance having an impedance substantially greater than the impedance of said capacitor, an output circuit for said reference circuit connected across said capacitor, a rectifier in said reference circuit output circuit, and a filter connected in circuit with the output of said reference circuit rectifier whereby a direct current voltage is obtained substantially proportional to the peak flux in said transformer core, the other of said magnetic amplifier saturating windings being connected to the output of said reference circuit rectifier whereby a signal proportional to the difference between the voltage across said output circuit and the voltage output of said reference circuit is applied to said variable impedance control element thereby to vary the impedance thereof whereby said output circuit voltage is stabilized.

11. A voltage stabilizer circuit comprising an input circuit adapted to be connected to a source of alternating current the voltage of which is to be stabilized, an output circuit for supplying a stabilized alternating current voltage, an autotransformer having its primary connected in series with a saturable core reactor across said input circuit and having its secondary connected to said output circuit, said saturable core reactor having a direct current saturating winding for varying the impedance thereof, a magnetic amplifier connected for energization from said input circuit and having its output connected to energize said saturable core reactor saturating winding, said magnetic amplifier having two direct current saturating windings arranged to provide bucking voltages, one of said magnetic amplifiers saturating windings being directly connected to said output circuit energized through a rectifier and energized solely by said stabilized voltage, and a reference circuit comprising a transformer having its primary winding and a current limiting inductance connected in series across said output circuit, said transformer having a core adapted to saturate at a voltage less than the peak value of the voltage across said output circuit, a resistor and capacitor connected in series across the secondary winding of said transformer forming an integrating circuit, said resistor having an impedance substantially greater than the impedance of said capacitor, an output circuit for said reference circuit connected across said capacitor, a rectifier in said reference circuit output circuit, and a filter connected in circuit with the output of said reference circuit rectifier whereby a direct current voltage is obtained substantially proportional to the peak flux in said transformer core, the other of said magnetic amplifier saturating windings being connected to said reference circuit output circuit whereby a signal proportional to the difference between the voltage across said output circuit and the voltage output of said reference circuit is applied to said saturable core reactor saturating winding thereby to vary the impedance of said saturable core reactor whereby said output circuit voltage is stabilized.

References Cited in the file of this patent

UNITED STATES PATENTS

| | | |
|---|---|---|
| 2,078,880 | Logan | Apr. 27, 1934 |
| 2,138,732 | Craig | Nov. 29, 1938 |
| 2,331,411 | Milarta | Oct. 12, 1943 |
| 2,722,655 | Anderson | Nov. 1, 1955 |
| 2,763,827 | Evans | Sept. 18, 1956 |